United States Patent
Loeser et al.

(10) Patent No.: US 12,306,730 B2
(45) Date of Patent: May 20, 2025

(54) AUTOMATED CHAOS ENGINEERING

(71) Applicant: SAP SE, Walldorf (DE)

(72) Inventors: Niklas Loeser, Heidelberg (DE); Sergey Smirnov, Heidelberg (DE); Paul Janson, Wiesloch (DE)

(73) Assignee: SAP SE, Walldorf (DE)

( * ) Notice: Subject to any disclaimer, the term of this patent is extended or adjusted under 35 U.S.C. 154(b) by 8 days.

(21) Appl. No.: 18/337,324

(22) Filed: Jun. 19, 2023

(65) Prior Publication Data

US 2024/0419566 A1 Dec. 19, 2024

(51) Int. Cl.
*G06F 11/00* (2006.01)
*G06F 11/263* (2006.01)

(52) U.S. Cl.
CPC .................. *G06F 11/263* (2013.01)

(58) Field of Classification Search
CPC ...................................... G06F 11/263
USPC ...................................... 714/1–57
See application file for complete search history.

(56) References Cited

U.S. PATENT DOCUMENTS

| | | | | |
|---|---|---|---|---|
| 6,484,276 B1* | 11/2002 | Singh | ................. | G06F 11/263 714/38.14 |
| 2011/0296242 A1* | 12/2011 | Elnozahy | ............ | G06F 11/3672 714/E11.144 |
| 2015/0161025 A1* | 6/2015 | Baset | .................. | G06F 11/2028 714/38.1 |
| 2015/0199207 A1* | 7/2015 | Lin | ......................... | H04L 43/50 718/1 |
| 2015/0278075 A1* | 10/2015 | Loganathan | ........ | G06F 11/3688 714/38.1 |
| 2016/0014238 A1* | 1/2016 | Massa | ..................... | H04L 43/50 714/33 |
| 2018/0137273 A1* | 5/2018 | Bacher | ................ | G06F 9/45558 |
| 2018/0365135 A1* | 12/2018 | Lake | .................... | G06F 11/3688 |
| 2022/0091966 A1* | 3/2022 | Wright | ................ | G06F 11/3684 |
| 2023/0412631 A1* | 12/2023 | Revankar | ............ | H04L 63/1408 |

\* cited by examiner

*Primary Examiner* — Sarai E Butler
(74) *Attorney, Agent, or Firm* — Fountainhead Law Group, PC (57) ABSTRACT

Techniques for automated chaos engineering may run an application on an internal production system. The internal production system is probed to determine an initial health status. If the initial health status indicates that the internal production system is in a stable state, a plurality of tests, such as functional tests or load tests, are conducted on the internal production system which create load at production levels. Chaos engineering actions are performed on the internal production system while the plurality of tests are being conducted. The chaos engineering actions cause system faults in the internal production system. The internal production system is probed after performing the chaos engineering actions to determine a later health status of the internal production system. An admin user is notified if the later health status of the internal production system is not a stable state after performing the chaos engineering actions.

20 Claims, 5 Drawing Sheets

AUTOMATED CHAOS ENGINEERING

BACKGROUND

The present disclosure pertains to cloud-based software applications and in particular to automated chaos engineering for cloud-based software applications.

With the advent of cloud software services, cloud software providers have gained responsibilities compared to the on-premise model. For example, software providers operating their services in the cloud may guarantee their customers a level of service availability. The service availability may be defined as well as penalties for deviations. Furthermore, software providers may give additional commitments about service such as security, service resilience, and quality assurance mechanisms. Prominent software certifications include ISO and SOC II, for example.

To ensure software quality, service providers may use methods to test, measure, and analyze their software. Chaos engineering is one approach to test service availability. Chaos engineering may build confidence in the stability and resilience of a system by causing targeted system faults. One chaos engineer approach is to conduct chaos tests on a production system, which has a risk of system outages. To reduce the system faults induced risks, chaos engineering might be implemented on a non-production system. However, testing on a non-production system gives rise to a number of challenges. For instance, the outcomes of chaos engineering should provide insights about resilience of a production system. Hence it is important for the system under test to be as close as possible to a production system. Furthermore, complete duplication of a production system solely for the purpose of chaos engineering may be a wasteful use of computing resources, besides being costly.

The present disclosure addresses these issue and others, as further described below.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," etc., do not necessarily indicate an ordering or sequence unless indicated. These terms, as used herein, may simply be used for differentiation between different objects or elements.

As mentioned above, chaos engineering is one approach to test service availability. It may build confidence in the stability and resilience of a system by causing targeted system faults. Conducting chaos tests on a production system has the disadvantage of risking system outages. However, testing on a non-production system may not provide accurate insights about the resilience of a production system unless the test system environment is similar to the production system. And yet, complete duplication of a production system solely for the purpose of chaos engineering may be a wasteful use of computing resources.

Many software service providers have internal production systems that are close to production systems in terms of configuration. However, internal production systems typically do not have production-like load (e.g., user-based load).

At the same time, the outcomes and results of the chaos engineering experiments are in scope of various certification processes. Generally, a certification process collects and documents results in a way which can be easily reviewed by auditors taking part in the certification. This may impose additional requirements on the chaos engineering approach and documentation of its outcomes.

To address these challenges, the present disclosure describes techniques for automatically conducting chaos engineering tasks against a system that resembles a production system both in terms of configuration and in terms of load on the system.

Figure 1:
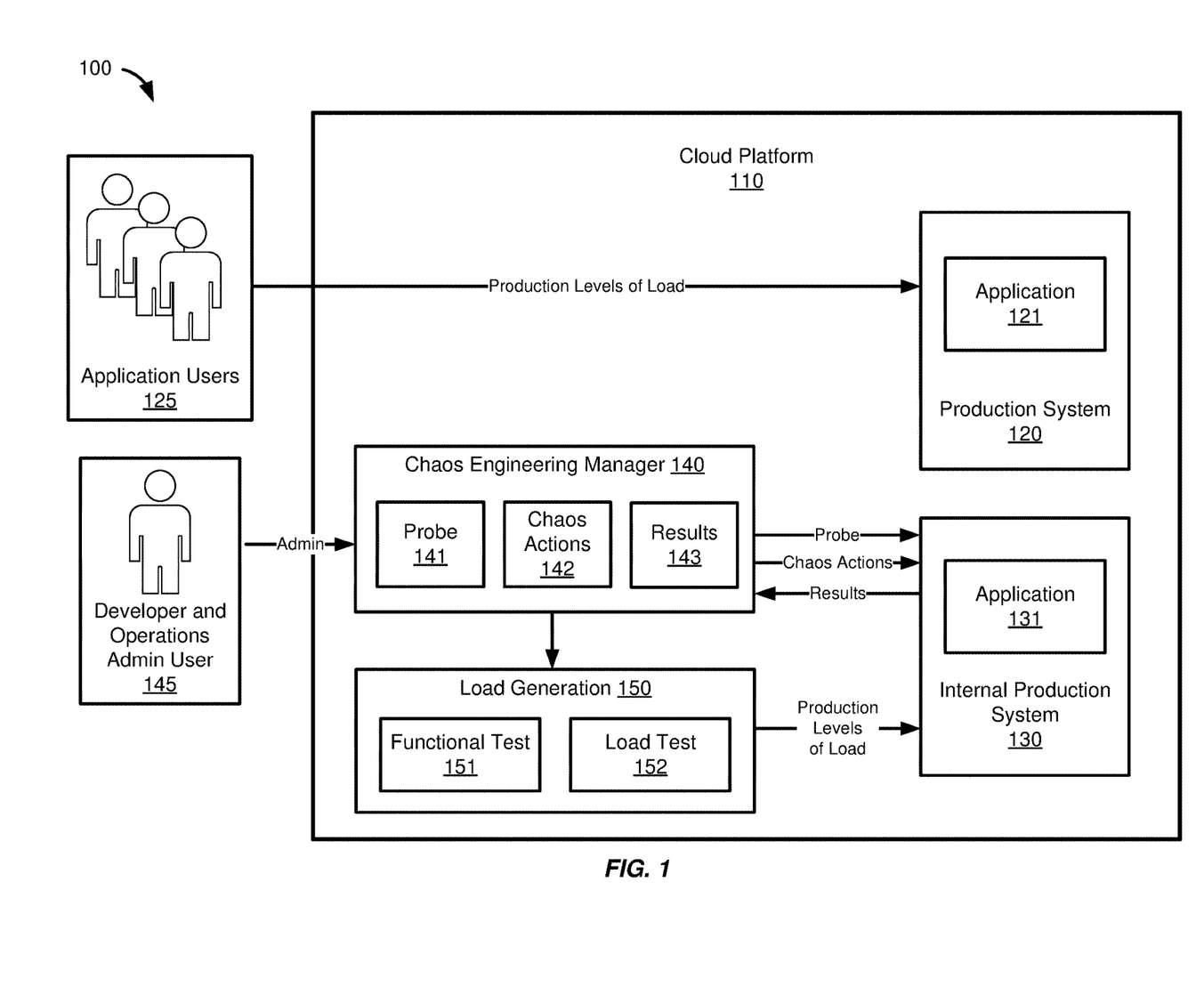
FIG. 1 shows a diagram of a production system, an internal production system, and a chaos engineering manager of a cloud platform, according to an embodiment.

FIG. 1 shows a diagram 100 of a production system 120, an internal production system 130, and a chaos engineering manager 140 of a cloud platform 110, according to an embodiment. The cloud platform may include a plurality of computer systems in communication with one another. These computer systems include the production system 120 and the internal production system 130. In general, a "production" system, is a system that provides services and software applications in a "production environment" where people (e.g., users) produce work products using the services. On the other hand, a "development" system generally refers to a system that is used to develop (e.g., design, build, and/or test) the services and software applications. In this context, an "internal production system" is a system that is designed and configured as a production system but which is used by "internal" users (e.g., internal to the organization designed the services and applications) for testing and design purposes, as opposed to "external" users (e.g., the "end user") working in the production environment mentioned above.

The cloud platform 110 of FIG. 1 is accessed by both application users 125 (e.g., "external users", or "end users") and by a developer and operations admin user 145 (e.g., an "internal user"). The application users access an application 121 running on the production system 120, which provide services to the application users 125. The requests and other demands from the users 125 put load (e.g., computational workload) on the production system 120, which the production system 120 is designed to handle while meeting certain service availability requirements (e.g., up-time percentage, response time, etc.)

As mentioned above, chaos engineering is one approach to test service availability. However, conducting chaos tests on the production system 120 has the disadvantage of risking system outages for the application users 125. However, testing on a non-production system (e.g., a development system) or an internal production system may not provide accurate insights about the resilience of a production system unless the test system environment is similar to the production system 120. That is, the system under test under may have a same level of load on it as the load from application users 125.

To achieve this, the cloud platform provides a chaos engineering manager component 140 and a load generation component 150 which are in communication with the internal production system 130. The chaos engineering manager component 140 and the load generation component 150 may each be implemented by one or more computer systems of the cloud platform 110, or by the same computer system(s). The internal production system 130 runs an application 131 which is the same application 121 run by the production system 120. The load generation component 150 runs functional tests 151 and/or load tests 152 to create one or more levels of load (e.g., at different times or over different time periods) on the internal production system 130 that is the same as the levels of load which the application users 125 place on the production system 120.

The chaos engineering manager component 140 is used by the development and operations admin user to configure administration of automated chaos engineering tests of the application 131, and potentially other applications on other systems.

The chaos engineering manager component 140 contains a probe component 141 configured to determine whether the internal production system 130 is in a steady state of operation by probing the health status of the internal production system 130. The chaos engineering manager component 140 is configured to automatically trigger chaos actions 142 at specified times or intervals if the internal production system 130 is in a steady state. Furthermore, the chaos engineering manager component 140 communicates with the load generation component 150 to initiate functional tests 151 and/or load tests 152, which simulate users (e.g., load from users) during the execution of the chaos actions 142.

The chaos actions 142 may be grouped into "experiments." The chaos actions 142, when executed on the internal production system 130, may introduce "chaos" into that system, which potentially cause system faults. The chaos engineering manager component 140 then collect the results 143 of these experiments (e.g., logs, whether the system maintained a steady state, etc.).

Features and advantages of such chaos engineering techniques are that availability of a production system during chaos can be evaluated using a different a non-production system (e.g., an internal production system) which has production configurations and the same levels of load as a production system, but without risking loss of system availability to users.

Additional features and advantages includes reduction of design and development costs as existing functional tests and load tests may be reused, since such test model real user load. Furthermore, chaos testing tools may automatically collect test results as evidence for product certification. This may include recording test configurations, recording test logs, recording chaos tasks as screenshots, recording service availability information as screenshots.

Chaos test automation is described in further detail below. A method for chaos test automation is described below with respect to FIG. 2. A model for chaos test automation is described with respect to FIG. 3. And then an example computer system implementation of chaos test automation is described with respect to FIG. 4.

Figure 2:
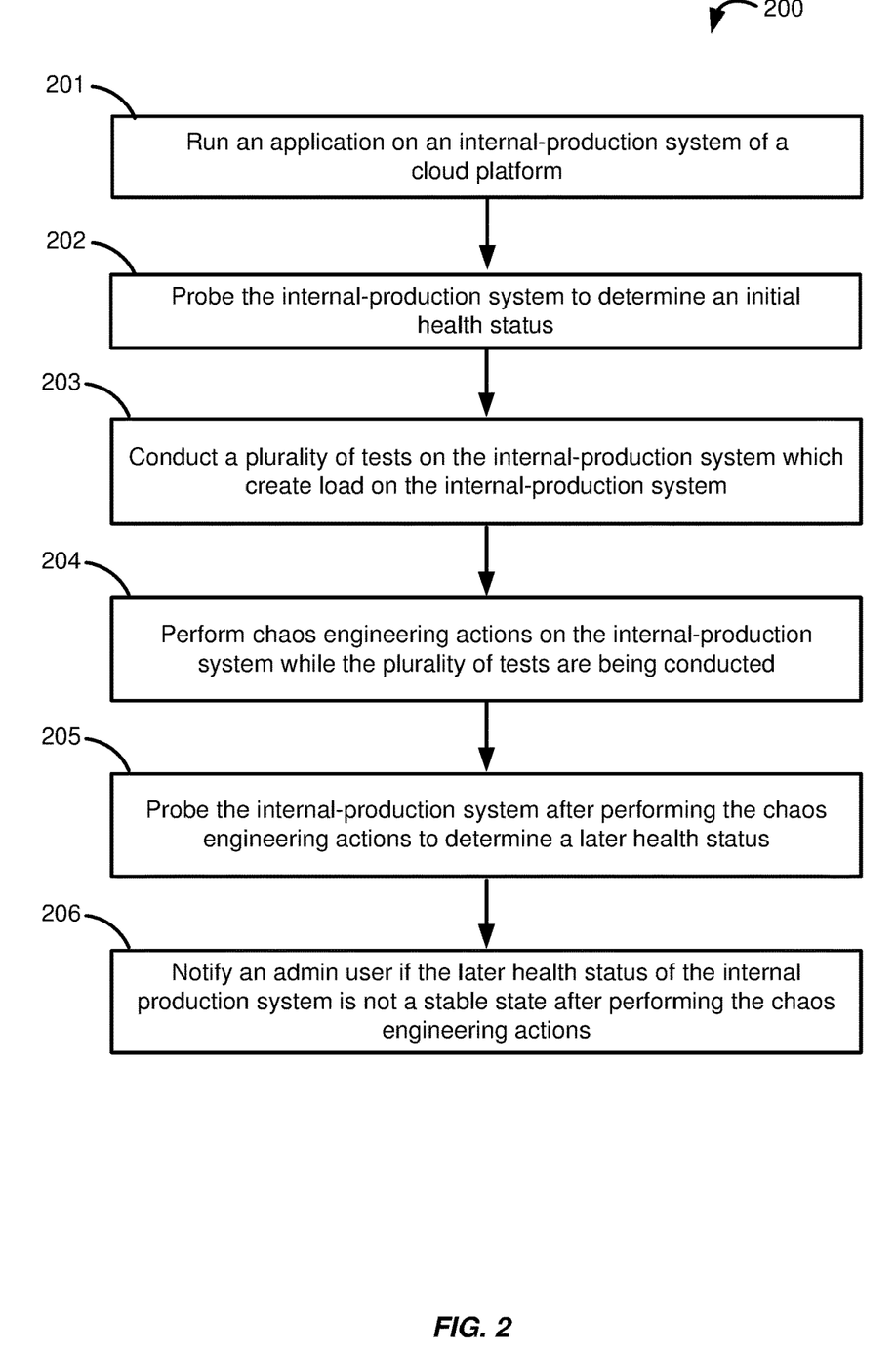
FIG. 2 shows a diagram of a method for chaos test automation, according to an embodiment.

FIG. 2 shows a diagram 200 of a computer-implemented method for chaos test automation, according to an embodiment. The method may be implemented by one or more computer systems operating on a cloud platform, for example. The method may be performed as follows:

At 201, run an application on an internal production system of a cloud platform. For example, the internal production system 130 of FIG. 1 runs the application 131. The internal production system may be separate and distinct from a production system of the cloud platform. For example, the internal production system 130 of FIG. 1 is a separate and distinct system from the production system 120 on the cloud platform 110.

The production system may provide services of the same application to a set of remote users which create load on the production system. For example, the production system 120 of FIG. 1 provides services of the software application 121 to the application users 125. The internal production system may not provide services of the application to the set of remote users. For example, the internal production system 130 of FIG. 1 does not provide services of the application 131 to the application users 125. That is, the application running on the production system operates in a production environment while the internal production system is not used by users in the production environment.

At 202, probe the internal production system to determine an initial health status of the internal production system. The probe may determine whether the internal production system is in a steady state of operation. The "steady state" may be defined by a set of conditions for measurements on the system's computing status.

At 203, if the initial health status indicates that the internal production system is in a stable state, conduct a plurality of tests on the internal production system which create load on the internal production system. In some embodiments, the plurality of tests include functional tests or load tests that simulate user-based load. These functional tests and load tests may be existing tests created during development of the software application.

At 204, perform chaos engineering actions on the internal production system while the plurality of tests are being conducted, the chaos engineering actions causing system faults in the internal production system. The chaos actions may introduce these system faults such that the system can be evaluated to determine how well it recovers from the faults. In some embodiments, the chaos engineering actions are part of one or more chaos experiments that define conditions for a steady state for that experiment, and wherein the probe checks these conditions. In some embodiments, the chaos engineering actions include create, read, update, and delete actions on the internal production system.

In some embodiments, the method further include capturing screenshots of the application run by the internal production system while performing the chaos engineering actions and presenting the screenshots to the admin user. In some embodiments, the method further includes generating a report containing audit evidence and system availability information based on the performance of the chaos engineering actions on the internal production system while the plurality of tests were being conducted.

At 205, probe the internal production system after performing the chaos engineering actions to determine a later health status of the internal production system. As mentioned above, the tests which create load are conducted, and the chaos engineering actions are performed, if the system under test (the internal production system) is in a steady state. If that system is still in a steady state according to the later health status, then the system was able to recover from any system faults caused by the chaos actions.

At 206, notify an admin user if the later health status of the internal production system is not a stable state after performing the chaos engineering actions. In some embodiments the method may notify the admin user of the health status regardless of whether the internal production system is in a stable state or not. Thus, the admin user does not need to manually start the tests, nor manually run functional or load tests, but instead configures the system to perform automated chaos engineering as described herein and then waits to be notified if the system under test was not able to return to a stable state afterwards. In some embodiments, the method further includes providing a chaos engineering user interface to the admin user. The chaos engineering user interface configured to add, remove, and configure chaos engineering actions.

A conceptual overview of automated chaos engineering is given now with respect to FIG. 3 while a more detailed example implementation is described below with respect to FIG. 4. FIG. 5 provides further details of systems and hardware that may be used to implement automated chaos engineering.

Figure 3:
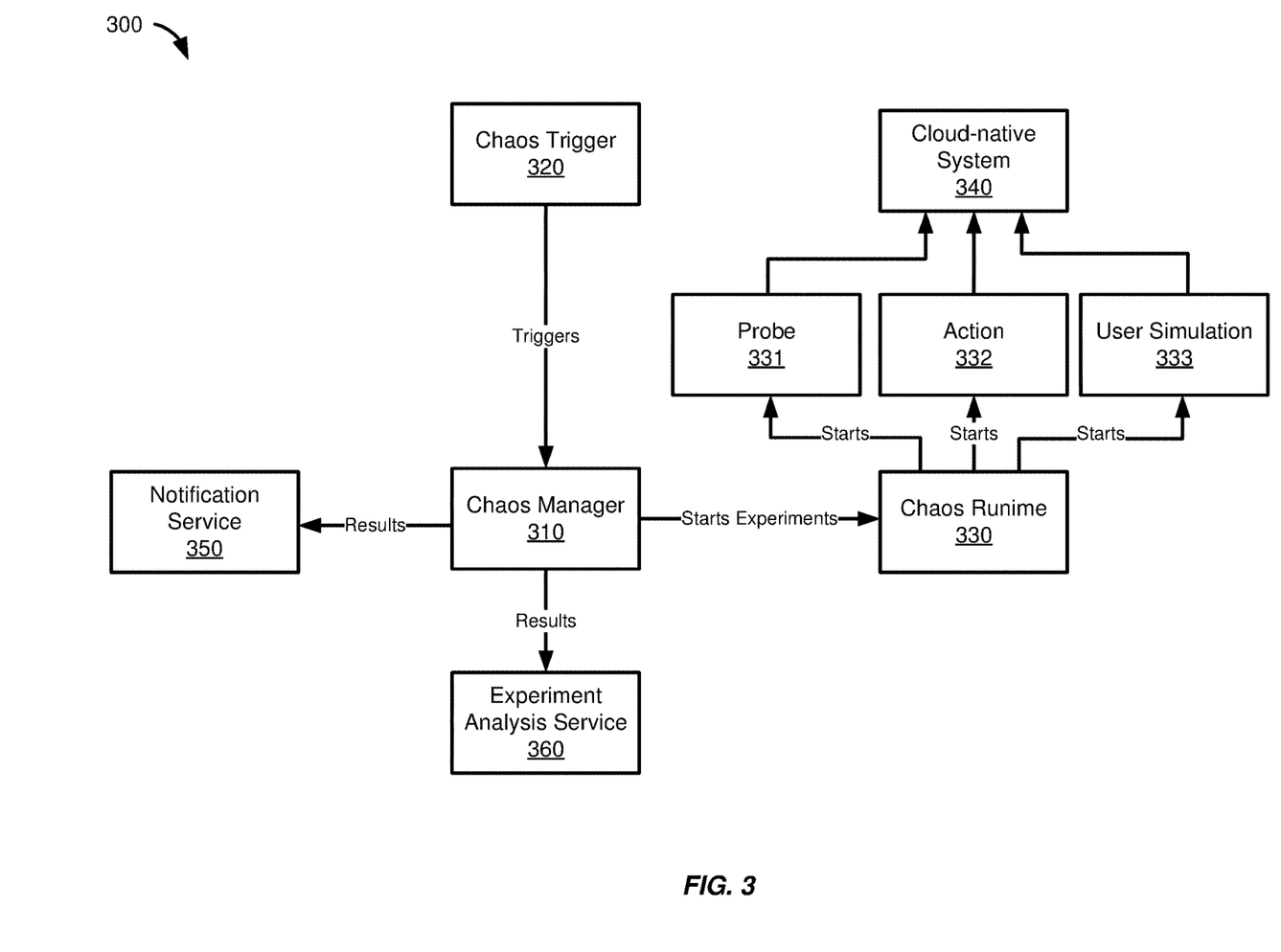
FIG. 3 shows a diagram of a model for chaos test automation, according to an embodiment.

FIG. 3 shows a diagram 300 of a model for chaos test automation, according to an embodiment. This model may be implemented by a computer system of a cloud platform, such as the cloud platform 110 described above with respect to FIG. 1. The model for chaos test automation includes a chaos manager component 310, chaos triggers 320, a chaos runtime 330, a notification service 350, and an experiment analysis service 360, which are described below. The chaos test automation is configured to test a cloud-native system 340

The component chaos manager 310 controls the chaos experiments to be run on the cloud-native system 340. The chaos manager 310 is configured to enable Create Read Update Delete (CRUD) actions 332 on chaos experiments, as well as execution and search functionality for experiments. Executed experiments may return a result, which may be persisted in the Chaos Manager 310. Results may either be successful or failed. These results may be provided to a user (e.g., an admin user) via a notification service 350 or they may be provided to an experiment analysis service 360 (e.g., a user interface) which may be accessed by the user.

The chaos experiments are executed using the chaos runtime component 330. The chaos runtime 330 is configured to parse and run chaos experiments (e.g., experiment definitions) and may provide dependencies for each experiment. Furthermore, each chaos experiment may define a "steady state." The steady state may define the conditions in which the system under test is in a stable state (e.g., available and responsive). The steady state may serve as a baseline to compare against during the execution of the chaos experiment. A probe 331 is a condition check, such as a steady state check, which runs in the chaos experiment runtime. Each experiment may contain several probes 331. The probes 331 may be executed at the beginning of the experiment. If the cloud-native system 340 is not in a stable state, then the experiment may not continue and may fail. It may be considered a failure as it was shown that the system is unstable, even without chaos actions 332 being performed. The probes 331 may also be run at the end of the experiments to verify if the cloud-native system 340 under test is still steady after the chaos actions 332 of the experiments have been performed.

To expand on the chaos actions 332, it is a principle of chaos engineering to cause realistic system faults in the system under test (e.g., cloud-native system 340). System faults may be caused by the actions 332 components. Each action 332 may define a set of steps to cause "chaos" (e.g., various system faults). The chaos runtime 330 may execute chaos actions 332 after the probes 331 have been run at the beginning of the experiment. As already mentioned, the system under test, against which the probes 331 and chaos actions 332 are run, is the component cloud-native system 340.

The chaos runtime 330 also starts the user simulation component 333 which is configured to bring the system under test (the cloud-native system 34), which may be a non-production system, to a production-like state. The user simulation component 333 may execute functional tests or load tests in order to achieve a level, or levels, of load that are the same as the level, or levels, of load on a production system.

The chaos runtime 330 runs the experiments, while performing user simulation 333, and the results of the experiments are obtained by the chaos manager 310. The chaos manager 310 may process the results using the experiment analysis service 360. The experiment analysis service 360 may provide further in-depth information and diagrams, by displaying diagrams containing historic data, for example. These diagrams may be presented in a user interface for review by an admin user, for example.

The chaos trigger component 320 is configured to automate the chaos experiment and result collection process. The notification service component 350 is configured to send notifications regarding the automated chaos testing. The chaos trigger component 320 may run automatically and trigger experiments through the chaos manager 310. After the experiments finish, the notification service 350 may generate automated notifications. Thus, the notification service may remove the need for a user to wait for the results of experiments. Instead, the user may check the results of experiments after they receive a notification.

Further details and an example implementation of automated chaos engineering are now given.

Figure 4:
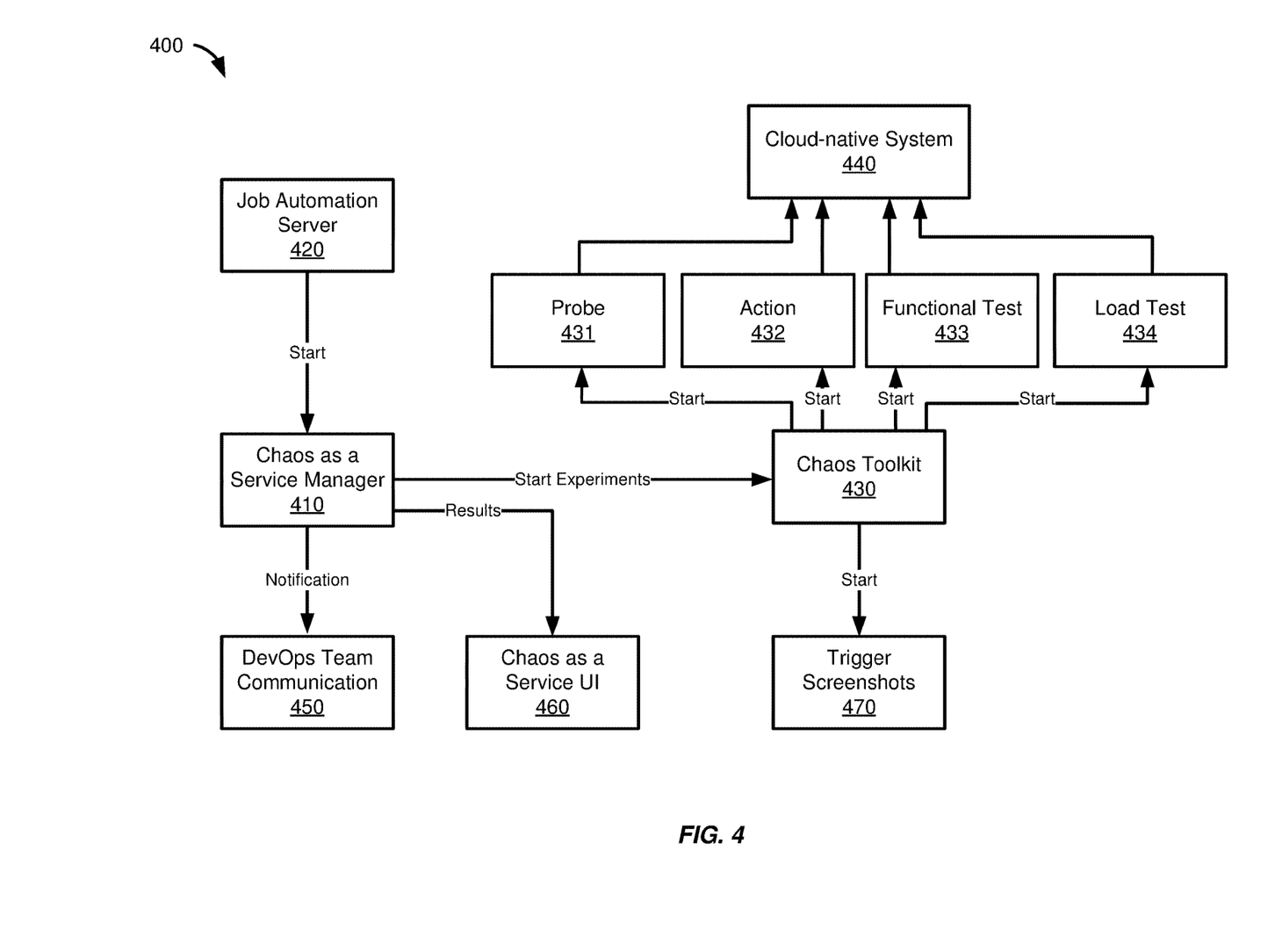
FIG. 4 shows a diagram of an implementation of chaos test automation, according to an embodiment.
Figure 5:
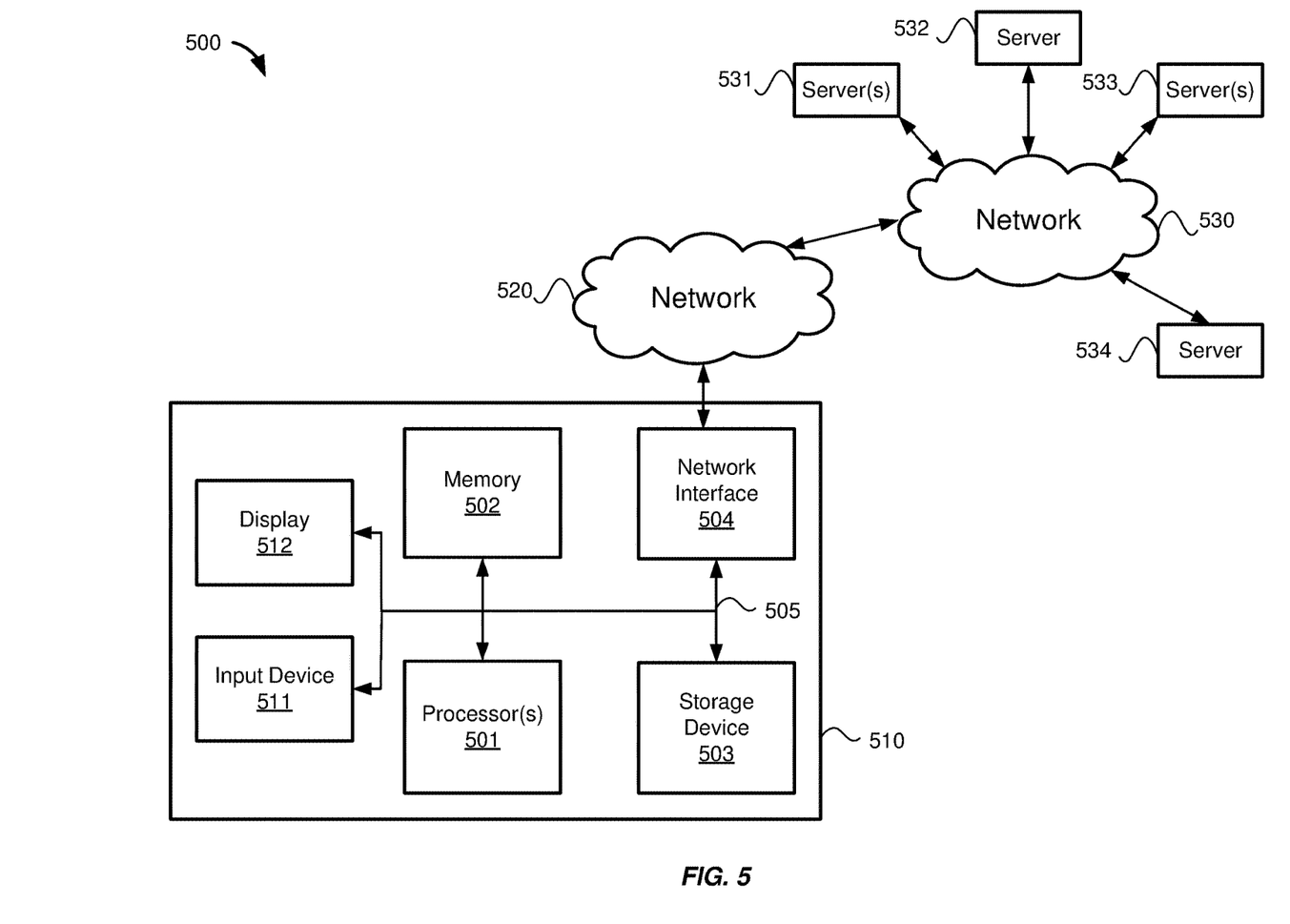
FIG. 5 shows a diagram of hardware of a special purpose computing machine for implementing systems and methods described herein.

FIG. 4 shows a diagram 400 of an implementation of chaos test automation, according to an embodiment. The components in FIG. 4 may implement chaos engineering techniques as described above with respect to FIG. 1-3 except as otherwise noted.

This implementation includes a Chaos as a Service (CaaS) manager 410, a job automation server 420, a chaos toolkit 430, a cloud-native system to be tested 440, a development and operations (DevOps) Team communication component 450, and a chaos as a service user interface (UI) 460.

The job automation server 420 is an example implementation of the functionality of the chaos trigger component 320 of FIG. 3. The job automation server 420 may be configured to execute the chaos tests in an automated fashion. An automation "job" executable by the job automation server 420 may be used as the implementation means to conduct a series of chaos tests one after another and collect the test outcomes in one place.

The chaos toolkit 420 is an example implementation of the chaos runtime 330 of FIG. 3. The chaos toolkit 420 may be configured to execute probes 431 to determine a health/system status of the cloud-native system 440 to determine whether it is in a steady state. The chaos toolkit 420 may implement chaos actions 432 against the cloud-native system 440 system under test. In addition, the chaos toolkit 430 may trigger and start load during chaos test execution using functional tests 430 and load tests 434. The chaos toolkit 420 may also collect reporting and audit relevant evidence by taking screenshots of reports with the system availability info and collect evidence on experiment execution by taking screenshots of chaos task execution. This information may be used to generate a report containing audit evidence and system availability information based on the performance of the chaos engineering actions on the internal production system while the plurality of tests were being conducted.

The chaos as a service (CaaS) manager component 410 is an example implementation of the chaos manager 310 of FIG. 3. The CaaS manager 410 may be configured to start experiments of the chaos toolkit 430, provide results to the chaos as a service UI 460, and provide notifications to the DevOps team communication component 450. The CaaS manager 410 may be triggered to start performing these tasks by the job automation server 420.

DevOps team communication component 450 is an example implementation of the notification service 350 of FIG. 3. The DevOps team communication component 450 enables the automated chaos test automation system to communicate test events to human users and stakeholders in a timely and reliable fashion. The CaaS manager 410, or the chaos toolkit 420, may be configured to send notifications over a text-based chat/messenger communication service.

The functional test 433 and load test 434 components are example implementations of the user simulation component 333. As mentioned above, a service in production environment experiences levels of load from users. To obtain representative chaos test results, the system under test may be brought to levels of load that are the same as the production environment. This may be done by generating service load leveraging functional tests 433 and/or load tests 434. Load tests 434 are designed to simulate realistic user behavior. Functional tests 434 that probe service end points may also be used, when load tests 434 are not available for example.

Features and advantages of the automated chaos engineering techniques described herein include reduction in chaos engineering costs through automation and reuse of load tests and functional tests, delivering reproducible chaos engineering results, and providing a certification-ready solution by storing results and screenshots of the tests.

Example Hardware

FIG. 5 shows a diagram 500 of hardware of a special purpose computing machine for implementing systems and methods described herein. The following hardware description is merely one example. It is to be understood that a variety of computers topologies may be used to implement the above described techniques. The hardware shown in FIG. 5 may be used to implement the computer systems and computer software (computer reprogram code) described herein.

The computer system 510 includes a bus 505 or other communication mechanism for communicating information, and one or more processor(s) 501 coupled with bus 505 for processing information. The computer system 510 also includes a memory 502 coupled to bus 505 for storing information and instructions to be executed by processor 501, including information and instructions for performing some of the techniques described above, for example. This memory may also be used for storing programs executed by processor(s) 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device and memory are both examples of non-transitory computer readable storage mediums.

The computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

The computer system also includes a network interface 504 coupled with bus 505. The network interface 504 may provide two-way data communication between computer system 510 and a network 520. The network interface 504 may be a wireless or wired connection, for example. The network 520 may be a local area network or an intranet, for example. The computer system 510 can send and receive information through the network interface 504, across the network 520, to computer systems connected to the Internet 530. Using the Internet 530 the computer system 510 may access data and features that reside on multiple different hardware servers 531-534. The servers 531-534 may be part of a cloud computing environment in some embodiments.

Additional Embodiments

Some embodiments provide a computer system, comprising one or more processors and one or more machine-readable medium coupled to the one or more processors. The one or more machine-readable medium storing computer program code comprising sets of instructions executable by the one or more processors. The sets of instructions are executable to run an application on an internal production system of a cloud platform. The internal production system being separate and distinct from a production system of the cloud platform. The production system may provide services of the same application to a set of remote users which create load on the production system. The internal production system may not be providing services of the application to the set of remote users.

The sets of instructions are further executable to probe the internal production system to determine an initial health status of the internal production system.

The sets of instructions are further executable to determine if the initial health status indicates that the internal production system is in a stable state and, if so, conduct a plurality of tests on the internal production system which create load on the internal production system.

The sets of instructions are further executable to perform chaos engineering actions on the internal production system while the plurality of tests are being conducted. The chaos engineering actions causing system faults in the internal production system.

The sets of instructions are further executable to probe the internal production system after performing the chaos engineering actions to determine a later health status of the internal production system.

The sets of instructions are further executable to notify an admin user if the later health status of the internal production system is not a stable state after performing the chaos engineering actions.

In some embodiments of the computer system, the computer program code further comprises sets instructions executable by the one or more processors to capture screenshots of the application run by the internal production system while performing the chaos engineering actions and present the screenshots to the admin user.

In some embodiments of the computer system, the plurality of tests include functional tests or load tests that simulate user-based load.

In some embodiments of the computer system, the computer program code further comprises sets of instructions executable by the one or more processors to generate a report containing audit evidence and system availability information based on the performance of the chaos engineering actions on the internal production system while the plurality of tests were being conducted.

In some embodiments of the computer system, the computer program code further comprises sets of instructions executable by the one or more processors to provide a chaos engineering user interface to the admin user, the chaos engineering user interface configured to add, remove, and configure chaos engineering actions.

In some embodiments of the computer system, the chaos engineering actions are part of one or more chaos experiments that define conditions for a steady state for that experiment, and wherein the probes of the internal production system check for these conditions.

In some embodiments of the computer system, the chaos engineering actions include create, read, update, and delete actions on the internal production system.

Some embodiments provide a non-transitory computer-readable medium storing computer program code. The computer program code comprises sets of instructions to run an application on an internal production system of a cloud platform. The internal production system being separate and distinct from a production system of the cloud platform. The production system may provide services of the same application to a set of remote users which create load on the production system. The internal production system may not provide services of the application to the set of remote users in some embodiments.

The computer program code further comprises sets of instructions to probe the internal production system to determine an initial health status of the internal production system;

The computer program code further comprises sets of instructions to determine if the initial health status indicates that the internal production system is in a stable state and, if so, conduct a plurality of tests on the internal production system which create load on the internal production system.

The computer program code further comprises sets of instructions to perform chaos engineering actions on the internal production system while the plurality of tests are being conducted. The chaos engineering actions causing system faults in the internal production system.

The computer program code further comprises sets of instructions to probe the internal production system after performing the chaos engineering actions to determine a later health status of the internal production system.

The computer program code further comprises sets of instructions to notify an admin user if the later health status of the internal production system is not a stable state after performing the chaos engineering actions.

In some embodiments of the non-transitory computer-readable medium, the computer program code further comprises sets of instructions to capture screenshots of the application run by the internal production system while performing the chaos engineering actions present the screenshots to the admin user.

In some embodiments of the non-transitory computer-readable medium, the plurality of tests include functional tests or load tests that simulate user-based load.

In some embodiments of the non-transitory computer-readable medium, the computer program code further comprises sets of instructions to generate a report containing audit evidence and system availability information based on the performance of the chaos engineering actions on the internal production system while the plurality of tests were being conducted.

In some embodiments of the non-transitory computer-readable medium, the computer program code further comprises sets of instructions to provide a chaos engineering user interface to the admin user, the chaos engineering user interface configured to add, remove, and configure chaos engineering actions.

In some embodiments of the non-transitory computer-readable medium, the chaos engineering actions are part of one or more chaos experiments that define conditions for a steady state for that experiment. Further, the probes of the internal production system check for these conditions.

In some embodiments of the non-transitory computer-readable medium, the chaos engineering actions include create, read, update, and delete actions on the internal production system.

Some embodiments provide a computer-implemented method. The method includes running an application on an internal production system of a cloud platform. The internal production system being separate and distinct from a production system of the cloud platform. The production system provides services of the same application to a set of remote users which create load on the production system. The internal production system may not provide services of the application to the set of remote users in some embodiments.

The method may further include probing the internal production system to determine an initial health status of the internal production system.

The method may further include determining if the initial health status indicates that the internal production system is in a stable state, and, if so, conducting a plurality of tests on the internal production system which create load on the internal production system.

The method may further include performing chaos engineering actions on the internal production system while the plurality of tests are being conducted. The chaos engineering actions causing system faults in the internal production system.

The method may further include probing the internal production system after performing the chaos engineering actions to determine a later health status of the internal production system.

The method may further include notifying an admin user if the later health status of the internal production system is not a stable state after performing the chaos engineering actions.

In some embodiments of the method, it further includes capturing screenshots of the application run by the internal production system while performing the chaos engineering actions and presenting the screenshots to the admin user.

In some embodiments of the method, the plurality of tests include functional tests or load tests that simulate user-based load.

In some embodiments of the method, it includes generating a report containing audit evidence and system availability information based on the performance of the chaos engineering actions on the internal production system while the plurality of tests were being conducted.

In some embodiments of the method, it includes providing a chaos engineering user interface to the admin user, the chaos engineering user interface configured to add, remove, and configure chaos engineering actions.

In some embodiments of the method, the chaos engineering actions are part of one or more chaos experiments that define conditions for a steady state for that experiment, and wherein the probes of the internal production system check for these conditions.

What is claimed is:

1. A computer system, comprising:
   one or more processors;
   one or more machine-readable medium coupled to the one or more processors and storing computer program code comprising sets of instructions executable by the one or more processors to:
   run an application on an internal production system of a cloud platform, the internal production system being separate and distinct from a production system of the cloud platform, the production system providing services of the same application to a set of remote users which create load on the production system, the internal production system not providing services of the application to the set of remote users;
   probe the internal production system to determine an initial health status of the internal production system;
   if the initial health status indicates that the internal production system is in a stable state, conduct a plurality of tests on the internal production system which create load on the internal production system;
   perform chaos engineering actions on the internal production system while the plurality of tests are being conducted, the chaos engineering actions causing system faults in the internal production system;
   probe the internal production system after performing the chaos engineering actions to determine a later health status of the internal production system; and
   notify an admin user if the later health status of the internal production system is not a stable state after performing the chaos engineering actions.

2. The computer system of claim 1, wherein the computer program code further comprises sets instructions executable by the one or more processors to:
   capture screenshots of the application run by the internal production system while performing the chaos engineering actions; and
   present the screenshots to the admin user.

3. The computer system of claim 1, wherein the plurality of tests include functional tests or load tests that simulate user-based load.

4. The computer system of claim 1, wherein the computer program code further comprises sets of instructions executable by the one or more processors to:
   generate a report containing audit evidence and system availability information based on the performance of the chaos engineering actions on the internal production system while the plurality of tests were being conducted.

5. The computer system of claim 1, wherein the computer program code further comprises sets of instructions executable by the one or more processors to:
   provide a chaos engineering user interface to the admin user, the chaos engineering user interface configured to add, remove, and configure chaos engineering actions.

6. The computer system of claim 1, wherein the chaos engineering actions are part of one or more chaos experiments that define conditions for a steady state for that experiment, and wherein the probes of the internal production system check for these conditions.

7. The computer system of claim 1, wherein the chaos engineering actions include create, read, update, and delete actions on the internal production system.

8. A non-transitory computer-readable medium storing computer program code comprising sets of instructions to:
   run an application on an internal production system of a cloud platform, the internal production system being separate and distinct from a production system of the cloud platform, the production system providing services of the same application to a set of remote users which create load on the production system, the internal production system not providing services of the application to the set of remote users;
   probe the internal production system to determine an initial health status of the internal production system;
   if the initial health status indicates that the internal production system is in a stable state, conduct a plurality of tests on the internal production system which create load on the internal production system;
   perform chaos engineering actions on the internal production system while the plurality of tests are being conducted, the chaos engineering actions causing system faults in the internal production system;
   probe the internal production system after performing the chaos engineering actions to determine a later health status of the internal production system; and
   notify an admin user if the later health status of the internal production system is not a stable state after performing the chaos engineering actions.

9. The non-transitory computer-readable medium of claim 8, wherein the computer program code further comprises sets of instructions to:
   capture screenshots of the application run by the internal production system while performing the chaos engineering actions; and
   present the screenshots to the admin user.

10. The non-transitory computer-readable medium of claim 8, wherein the plurality of tests include functional tests or load tests that simulate user-based load.

11. The non-transitory computer-readable medium of claim 8, wherein the computer program code further comprises sets of instructions to:
generate a report containing audit evidence and system availability information based on the performance of the chaos engineering actions on the internal production system while the plurality of tests were being conducted.

12. The non-transitory computer-readable medium of claim 8, wherein the computer program code further comprises sets of instructions to:
provide a chaos engineering user interface to the admin user, the chaos engineering user interface configured to add, remove, and configure chaos engineering actions.

13. The non-transitory computer-readable medium of claim 8, wherein the chaos engineering actions are part of one or more chaos experiments that define conditions for a steady state for that experiment, and wherein the probes of the internal production system check for these conditions.

14. The non-transitory computer-readable medium of claim 8, wherein the chaos engineering actions include create, read, update, and delete actions on the internal production system.

15. A computer-implemented method, comprising:
running an application on an internal production system of a cloud platform, the internal production system being separate and distinct from a production system of the cloud platform, the production system providing services of the same application to a set of remote users which create load on the production system, the internal production system not providing services of the application to the set of remote users;
probing the internal production system to determine an initial health status of the internal production system;
if the initial health status indicates that the internal production system is in a stable state, conducting a plurality of tests on the internal production system which create load on the internal production system;
performing chaos engineering actions on the internal production system while the plurality of tests are being conducted, the chaos engineering actions causing system faults in the internal production system;
probing the internal production system after performing the chaos engineering actions to determine a later health status of the internal production system; and
notifying an admin user if the later health status of the internal production system is not a stable state after performing the chaos engineering actions.

16. The computer-implemented method of claim 15, further comprising:
capturing screenshots of the application run by the internal production system while performing the chaos engineering actions; and
presenting the screenshots to the admin user.

17. The computer-implemented method of claim 15, wherein the plurality of tests include functional tests or load tests that simulate user-based load.

18. The computer-implemented method of claim 15, further comprising:
generating a report containing audit evidence and system availability information based on the performance of the chaos engineering actions on the internal production system while the plurality of tests were being conducted.

19. The computer-implemented method of claim 15, further comprising:
providing a chaos engineering user interface to the admin user, the chaos engineering user interface configured to add, remove, and configure chaos engineering actions.

20. The computer-implemented method of claim 15, wherein the chaos engineering actions are part of one or more chaos experiments that define conditions for a steady state for that experiment, and wherein the probes of the internal production system check for these conditions.

* * * * *